(12) United States Patent
Chapman

(10) Patent No.: US 11,218,607 B1
(45) Date of Patent: Jan. 4, 2022

(54) TWO LAYER CORRELATION MARKS WITH VARIABLE DATA HIDING LAYER

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/113,075

(22) Filed: Dec. 6, 2020

(51) Int. Cl.
*H04N 1/08* (2006.01)
*H04N 1/00* (2006.01)
*H04N 1/32* (2006.01)
*H04N 1/387* (2006.01)

(52) U.S. Cl.
CPC ..... *H04N 1/00456* (2013.01); *H04N 1/32309* (2013.01); *H04N 1/3871* (2013.01)

(58) Field of Classification Search
CPC .............. H04N 1/00456; H04N 1/32309
See application file for complete search history.

(56) References Cited

U.S. PATENT DOCUMENTS

| | | | |
|---|---|---|---|
| 8,675,259 B2 | 3/2014 | Chapman et al. | |
| 9,471,846 B2 | 10/2016 | Fan et al. | |
| 9,628,663 B1 | 4/2017 | Chapman | |
| 2004/0000786 A1 | 1/2004 | Xu et al. | |
| 2009/0122349 A1 | 5/2009 | Bala et al. | |
| 2013/0128317 A1* | 5/2013 | Chapman | H04N 1/54 358/2.1 |
| 2015/0244897 A1* | 8/2015 | Chapman | H04N 1/32 358/1.14 |
| 2019/0297221 A1 | 9/2019 | Chapman | |

OTHER PUBLICATIONS

Shen-ge Wang, Chu-heng Liu, and Beilei Xu, "Glossmark technology: beyond halftone frequencies", Abstract, Proc. SPIE 5667, Color Imaging X: Processing, Hardcopy, and Applications, (Jan. 17, 2005); https://doi.org//10.1117/12.588595 (https://doi.org/10.1117/12.588595).

* cited by examiner

*Primary Examiner* — Ibrahim Siddo
(74) *Attorney, Agent, or Firm* — Ortiz & Lopez, PLLC; Luis M. Ortiz; Kermit D. Lopez

(57) ABSTRACT

A method and system for rendering a correlation mark, can involve determining a combined path of a foreground comprising a first layer based on a first correlation pattern and a background comprising a second layer based on a second correlation pattern. The size of the second layer of the second layer can be calculated based on a trade off between how well the second layer hides a correlation effect and a readability of the second layer. The combined path can be filled with variable data at the size of the second layer at a selected color or a third correlation pattern to produce a two-layer correlation mark having a variable data hiding layer for rendering on or through a recording medium.

20 Claims, 8 Drawing Sheets

TWO LAYER CORRELATION MARKS WITH VARIABLE DATA HIDING LAYER

TECHNICAL FIELD

Embodiments are related to image processing methods, systems and devices. Embodiments also relate to printing devices and techniques. Embodiments further relate to security features such as watermarks. Embodiments are further related to correlation marks. Embodiments also relate to security printing using correlation marks, and more particularly to the use of two-layer correlation marks.

BACKGROUND

In conventional printing processes that require security measures, a pattern color space having specialty imaging characteristics has been utilized to provide the security measures and prevent counterfeiting of printed materials. Furthermore, in conventional printing processes, a pattern color space has been utilized, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples are in prescriptions, contracts, documents, coupons, and tickets. Typically, several specialty-imaging techniques are used at various positions in a document. In addition, these security elements may in some cases conflict with the overall aesthetics of the document.

A correlation mark is one example of a security mark or a security feature. A correlation mark can include one or more elements that are invisible or hardly visible on a printed document. The hidden elements can become visible when the document is viewed through a correlation mask that serves as a "key" to the correlation mark. When copying or scanning a document having a correlation mark, the correlation mark can survive and can still be decoded in the resulting copy.

Current "correlation" or "CR" effects can "hide" information, making it visible only with a decoder sheet. These effects, however, may survive copying and reveal the hidden information in the resulting copies as well.

Correlation Marks and a decoding key can be used in some applications to produce the correlation effect. In some situations, a two-layer correlation effect may be present, wherein both layers are encoded correlation marks at different angles and one layer can be viewed with the key, which may be then rotated (e.g., 90 degrees) to view the second layer.

There may be a two-layer effect, however, in the situation where variable data that is mostly visible without the decoding key becomes mostly invisible with the decoding key. Users may prefer, however, two-layer effects as they can 'pack' at least twice the security in the same amount of real estate. To date, the implementation of two-layer effects has not been effectively implemented.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image processing methods, systems and devices.

It is another aspect of the disclosed embodiments to provide for improved methods and systems for rendering watermarks used for securing documents.

It also an aspect of the disclosed embodiments to provide for improved methods and systems for rendering correlation marks.

It is further aspect of the disclosed embodiments to provide for methods and systems for rendering two layer correlation marks with a variable data hiding layer.

The aforementioned aspects and other objectives and advantages can now be achieved as described herein. In an embodiment, a method for rendering a correlation mark on or through a recording medium, can involve: determining a combined path of a foreground comprising a first layer based on a first correlation pattern and a background comprising a second layer based on a second correlation pattern; calculating a size of the second layer based on a trade off between how well the second layer hides a correlation effect and a readability of the second layer; and filling the combined path with variable data at the size of the second layer at a selected color or a third correlation pattern to produce a two-layer correlation mark having a variable data hiding layer for rendering on or through a recording medium, the two-layer correlation mark including the first layer and the second layer with the combined path filed with the variable data at the size of the second layer at the selected color or the third correlation pattern.

In an embodiment, the foreground can comprise a variable object.

In an embodiment, the background can comprise a variable object.

In an embodiment, the foreground can comprise a foreground object.

In an embodiment, the background can comprise a background object.

In an embodiment, background can comprise a background object text box and the foreground comprises a foreground object text box.

In an embodiment, the variable data can comprise a variable data stream.

In an embodiment, a system for rendering a correlation mark on or through a recording medium, can include at least one processor and a non-transitory computer-usable medium embodying computer program code, the computer-usable medium operable to communicate with the at least one processor. The computer program code can include instructions executable by the at least one processor and operable to: determine a combined path of a foreground comprising a first layer based on a first correlation pattern and a background comprising a second layer based on a second correlation pattern; calculate a size of the second layer based on a trade off between how well the second layer hides a correlation effect and a readability of the second layer; and fill the combined path with variable data at the size of the second layer at a selected color or a third correlation pattern to produce a two-layer correlation mark having a variable data hiding layer for rendering on or through a recording medium, the two-layer correlation mark including the first layer and the second layer with the combined path filed with the variable data at the size of the second layer at the selected color or the third correlation pattern.

In an embodiment, a correlation mark can comprise a two-layer correlation mark including a first layer and a second layer, wherein: a combined path is determined from a foreground comprising the first layer based on a first correlation pattern and a background comprising the second layer based on a second correlation pattern; a size of the second layer is calculated based on a trade off between how well the second layer hides a correlation effect and a readability of the second layer; and the combined path is filled with variable data at the size of the second layer at a selected color or a third correlation pattern to produce the two-layer correlation mark having a variable data hiding layer for rendering on or through a recording medium, the two-layer correlation mark including the first layer and the second layer with the combined path filed with the variable data at the size of the second later at the selected color or the third correlation pattern.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
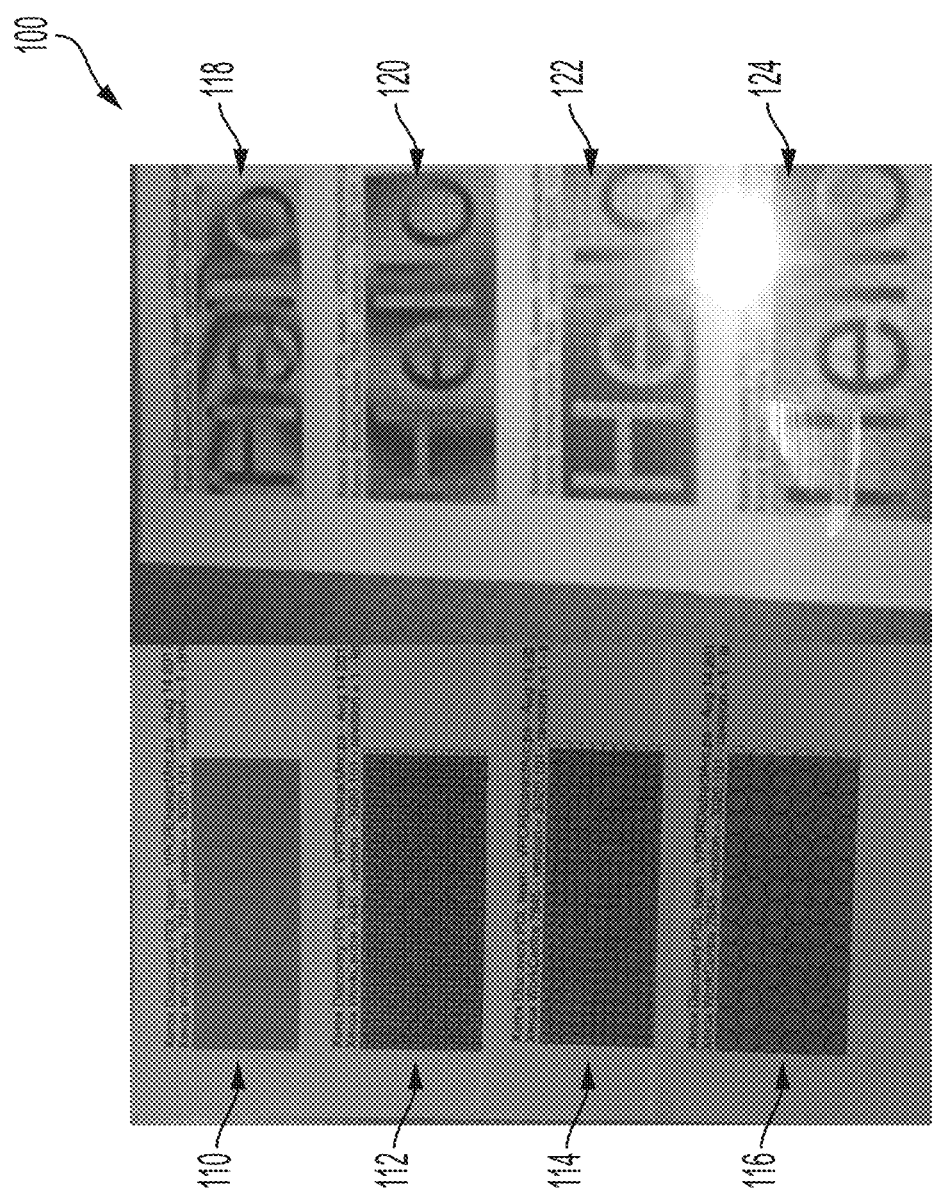
FIG. 1 illustrates an image of a vector pattern CR mark including a hiding layer with and without a decoding key.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

In the area of security printing, documents can be protected from copying, forging and counterfeiting using multiple techniques. Specialty imaging is one such method of security printing, which can use standard material such as papers inks and toners. Typically, security-printing companies in the marketplace require special (expensive) materials. An example document is a prescription where a pharmacist would like to be able to have a satisfactory level of confidence that the document is genuine.

FIG. 1 illustrates an image 100 of a vector pattern CR mark including a hiding layer with and without a decoding key. The image 100 may be a digital image. The left side of the image 100 shown in FIG. 1 is depicted without the decoding key. That is, the left side of the image 100 includes an image 110, an image 112, an image 114, and an image 116. The top image 110 shown at the left side of FIG. 1 is depicted without any segmentation layer followed (below) by adding segmentation layers at different frequencies (i.e., image 112, followed by image 114 and then image 116). Eventually, any underlying text or encoded message or object(s) will be well hidden. The right side of the image 100 depicted in FIG. 1 is shown with the key such that the underlying displayed "Hello" text or message is correctly readable in each image 118, image 120, image 122, and image 124. FIG. 1 thus depicts a vector pattern CR Mark with the hiding layer with and without the decoding key.

Note that the words "key" and "decoding key" may be utilized interchangeably to refer to the same feature or element. Some security features, such as a correlation mark may use a screen or key to decode. The key may be a screen or optical light filter made by printing a pattern of light interference lines on a transparent sheet of material, such as plastic or glass (e.g., a transparency). The key may be placed on (or held within millimeters of) the document when decoding hidden markings.

Figure 2:
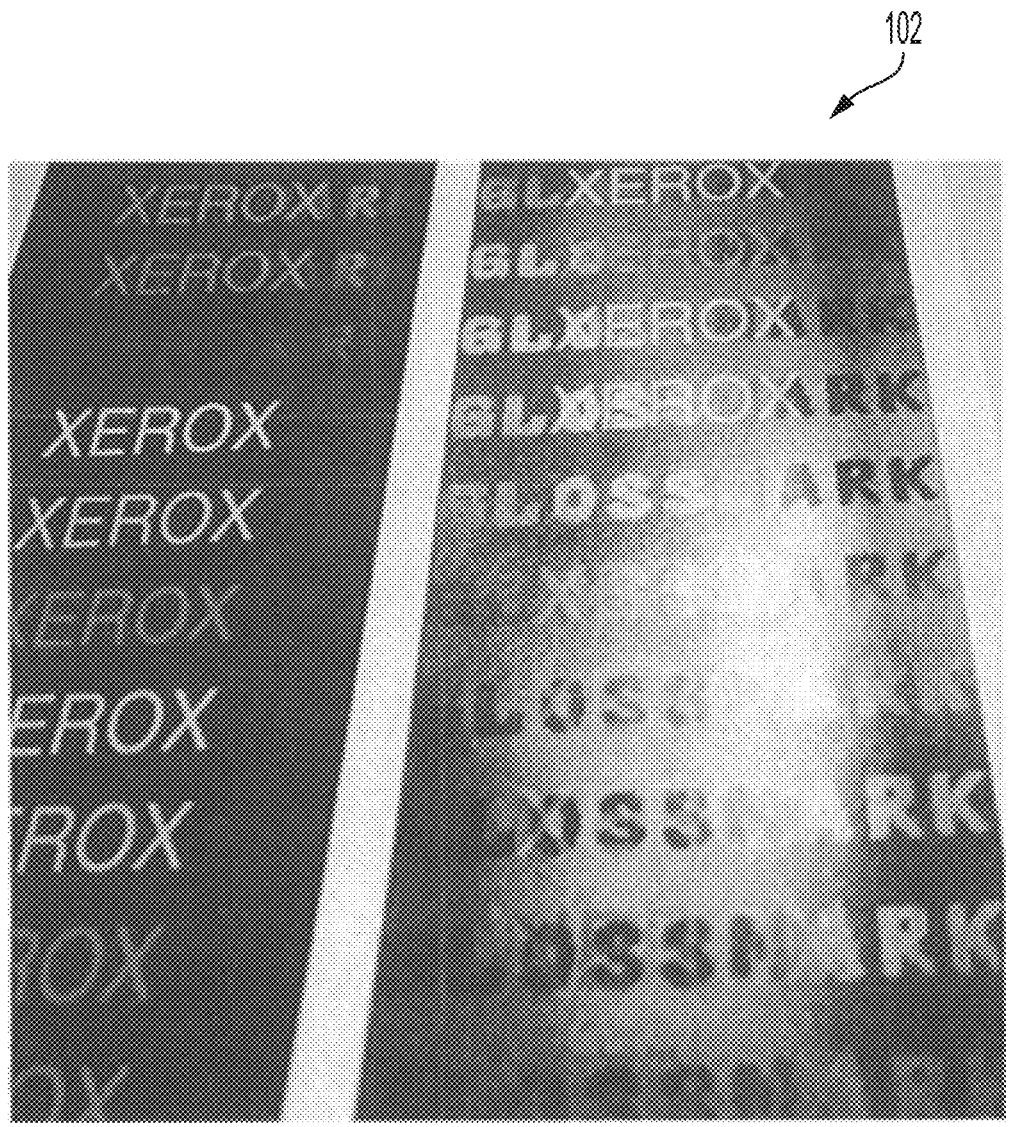
FIG. 2 illustrates an image depicting an example of a two-layer SI effect.

FIG. 2 illustrates an image 102 depicting an example of a two-layer SI effect. The image 102 may be a digital image. A two-layer effect can involve a situation in which two independent effects with independent variable data sharing the same space become visible or invisible under different conditions. One such example is a 2-L GlossMark as shown in the image 102 FIG. 2. The left and right sides of the image 102 are the same piece of paper at two different angles. The data that may be visible at one angle may be come invisible at the other. Image 102 thus displays an example of double layer GlossMark text showing both layers of gloss and visible variable data.

Note that the term "GlossMark," "GLOSSMARK" or "Glossmark" is a registered trademark of Xerox Corporation and relates to a glossmark technology based on a halftone-based digital imaging process to embed visible watermarks into color prints and renderings. The gloss of a print or rendering may depend not only on surface roughness of paper and toner, but also on the microscopic structure created by the halftone process. The surface relief of a halftone image can be treated as a two-dimensional phase grating.

The shape, or profile, of the surface relief can determine the reflected pattern of the illumination. A strong angular differential gloss can be obtained by employing two anisotropic halftone screens in the halftone process. A careful design of these screens enables embedding GlossMark images while maintaining the high quality of the color reproduction. The printing process, that simultaneously creates high quality primary and GlossMark images in a single step, requires neither special equipment nor special paper or toner. GlossMark images, shown in a high contrast of gloss, provide a perfect simulation of the traditional paper watermarks, while their digital implementation makes it easy to embed variable data as digital watermarks into individual documents.

Note that terms 'render' or 'rendering' as utilized herein can relate to rendering of a print job for printing, involving program-specific data, such as text, images, and formatting, and converting them into a format that is compatible with a destination printer. The terms 'render' or 'rendering' can also relate to scanning of an image and/or text and storing data presenting the image on or through a recording medium and printing of the scanned image and/or text.

The embodiments, which can include the implementation and use of two layer correlation marks with at least one (one or more) variable data hiding layer, can be illustrated by way of an example involving a background object text box and a foreground object text, but any variable objects may be used (e.g. corporate logos and circles). In such an example, a method for implementing two layer correlation marks with one or more variable hiding layers can be implemented according to the following steps:

1) Fill the background object with one CR pattern
2) Erase the foreground object
3) Fill the foreground object with the other CR pattern
4) Calculate the combined path of the foreground and background objects
5) Calculate the size of $2^{nd}$ layer based on a trade off between how well it hides the CR effect and $2^{nd}$ layer readability
6) Select a third color or pattern
7) Fill the path from step 4 with the variable data at the size from step 5 at the color or pattern from step 6

Figure 3:
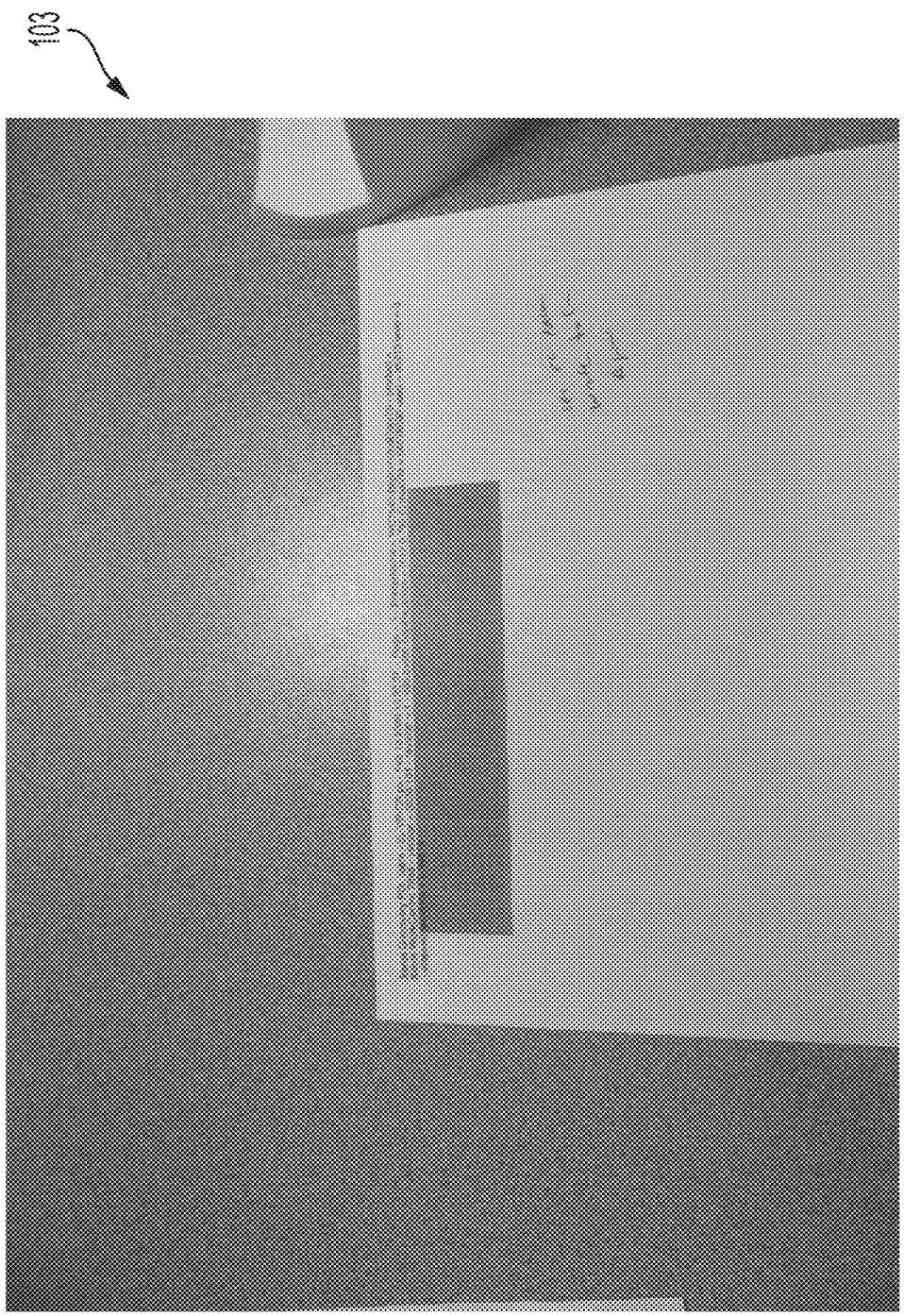
FIG. 3 illustrates an image of a correlation mark without a decoding key showing the visible layer.
Figure 4:
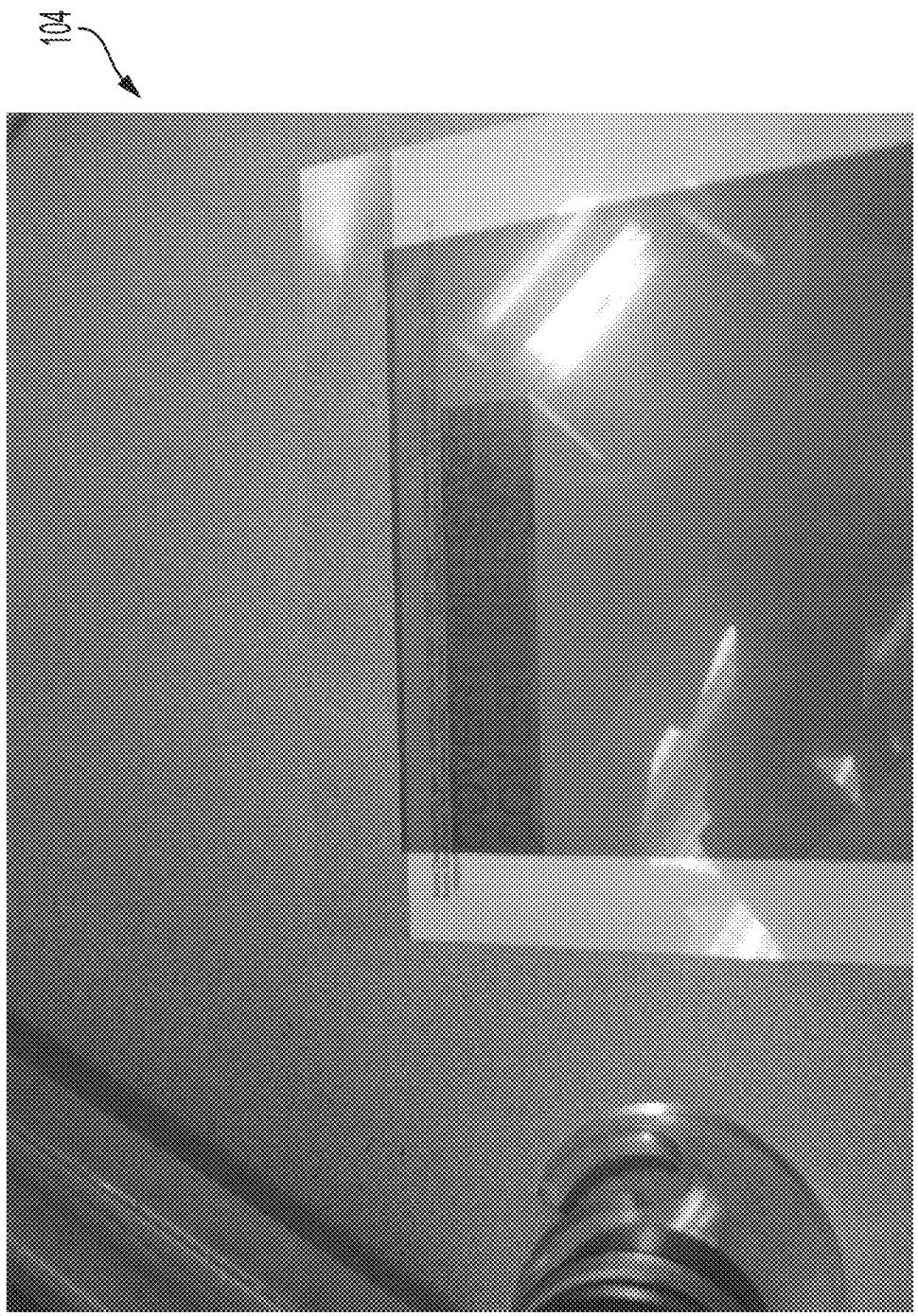
FIG. 4 illustrates an image of a correlation mark with the decoding key showing a hidden layer.

The above steps 1-3 can be implemented to write the vector pattern correlation mark. For step 4, in this example, the text may be entirely within the text box, so the text box path can be calculated. More complex examples may be implemented. Step 5 can be implemented empirically as shown in the example depicted in FIG. 1 with the addition of the readability of the second layer. The color red, for example, may be selected in step 6, as this color is easy to read on the gray correlation mark. The results from step 7 are shown with and without the decoding key in FIG. 3 and FIG. 4. That is, FIG. 3 illustrates an image 103 of a correlation mark without a decoding key showing the visible layer. FIG. 4 illustrates an image 104 of the correlation mark with the decoding key showing a hidden layer. The image 103 and the image 104 may be digital images.

Note that the term 'variable data' as utilized herein can relate to a variable data stream. The term 'data stream' as utilized herein can relate to a process of transferring a stream of data from one place to another, to a sender and recipient or through some network trajectory. Data streaming can be applied in multiple ways with various protocols and tools that help provide security, efficient delivery and other data results.

FIG. 3 and FIG. 4 show the same correlation mark with and without the decoding key. In each view one independent variable data string is mostly visible while the other independent variable data string is mostly invisible. The embodiments shown in FIG. 3 and FIG. 4 can thus demonstrate a visible layer and an invisible layer without the key and invisible→visible and visible→invisible with the key.

Furthermore, it should be noted that the image 103 shown in FIG. 3 may need zooming in order to be able to read the text. That is, the images may be shown correctly at a zoom of 200% but could change depending on the viewing system and software. The figures presented and illustrated herein are examples only and may be viewed at a different size for a sheet of, for example, 8.5×11 media. Zooming of images may results in slightly different views of the example images illustrated and discussed herein.

Figure 5:
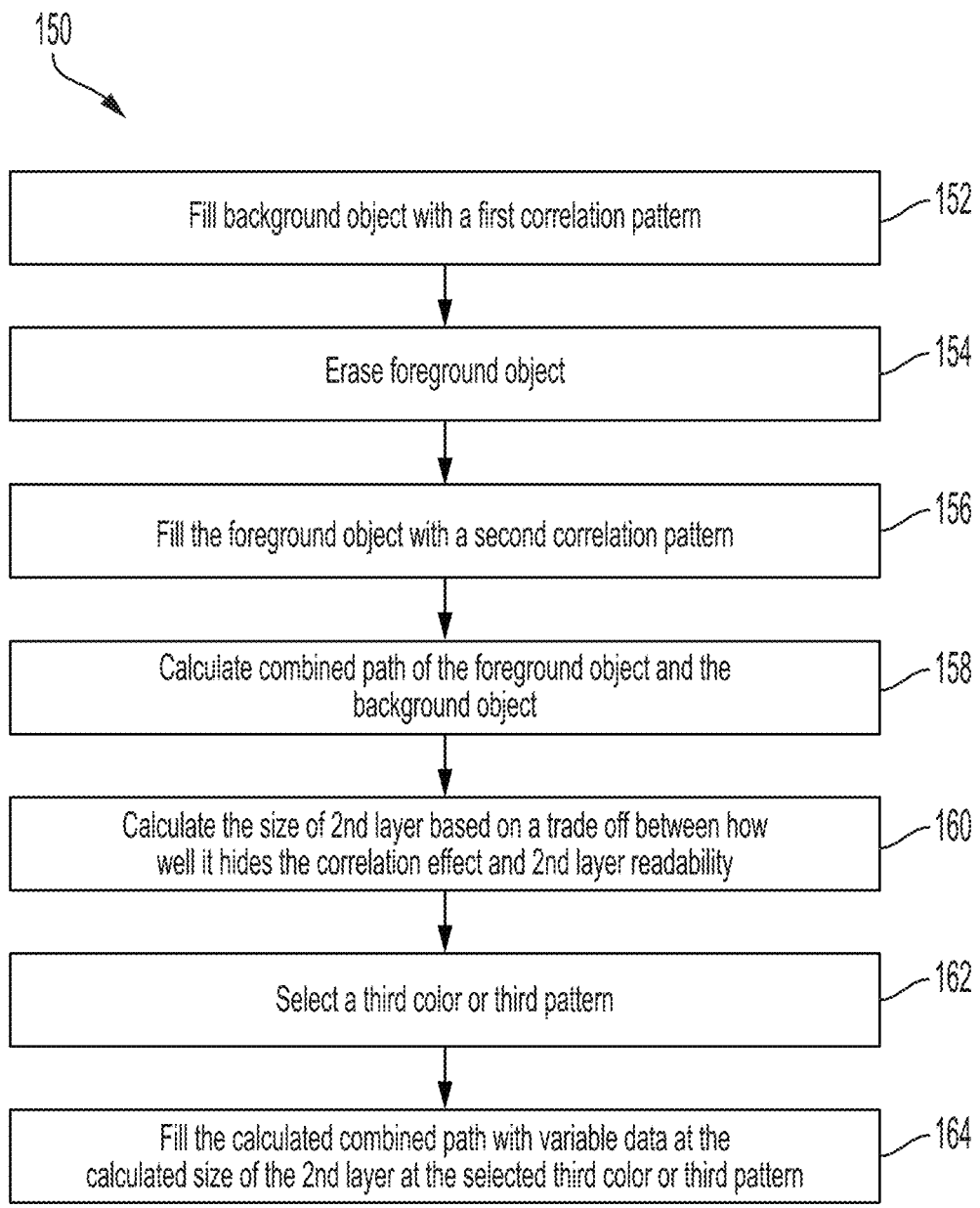
FIG. 5 illustrates a flow chart of operations illustrating logical operational steps of a method for providing two layer correlation marks with a variable data hiding layer, in accordance with an embodiment.

FIG. 5 illustrates a flow chart of operations illustrating logical operational steps of a method 150 for providing two layer correlation marks with a variable data 'hiding layer', in accordance with an embodiment. As indicated at block 152, a step or operation can be implemented to fill a background object with a first correlation pattern. Next, as shown at block 154, a step or operation can be implemented to erase the foreground object. Thereafter, as depicted at block 156, a step or operation can be implemented to fill the foreground object with a second correlation pattern.

Next, as shown at block 158, a step or operation can be implemented to calculate the combined path of the foreground and background objects. Then, as illustrated at block 160, a step or operation can be implemented to calculate the size of the second layer based on a trade off between how well the second layer hides the correlation effect and second layer readability. Next, as depicted at block 162, a step or operation can be implemented to select a third color or pattern. Thereafter, as depicted at block 164, a step or operation can be implemented to fill the calculated combined path with the variable data at the calculated size of the second layer at the selected third color or third pattern.

Figure 6:
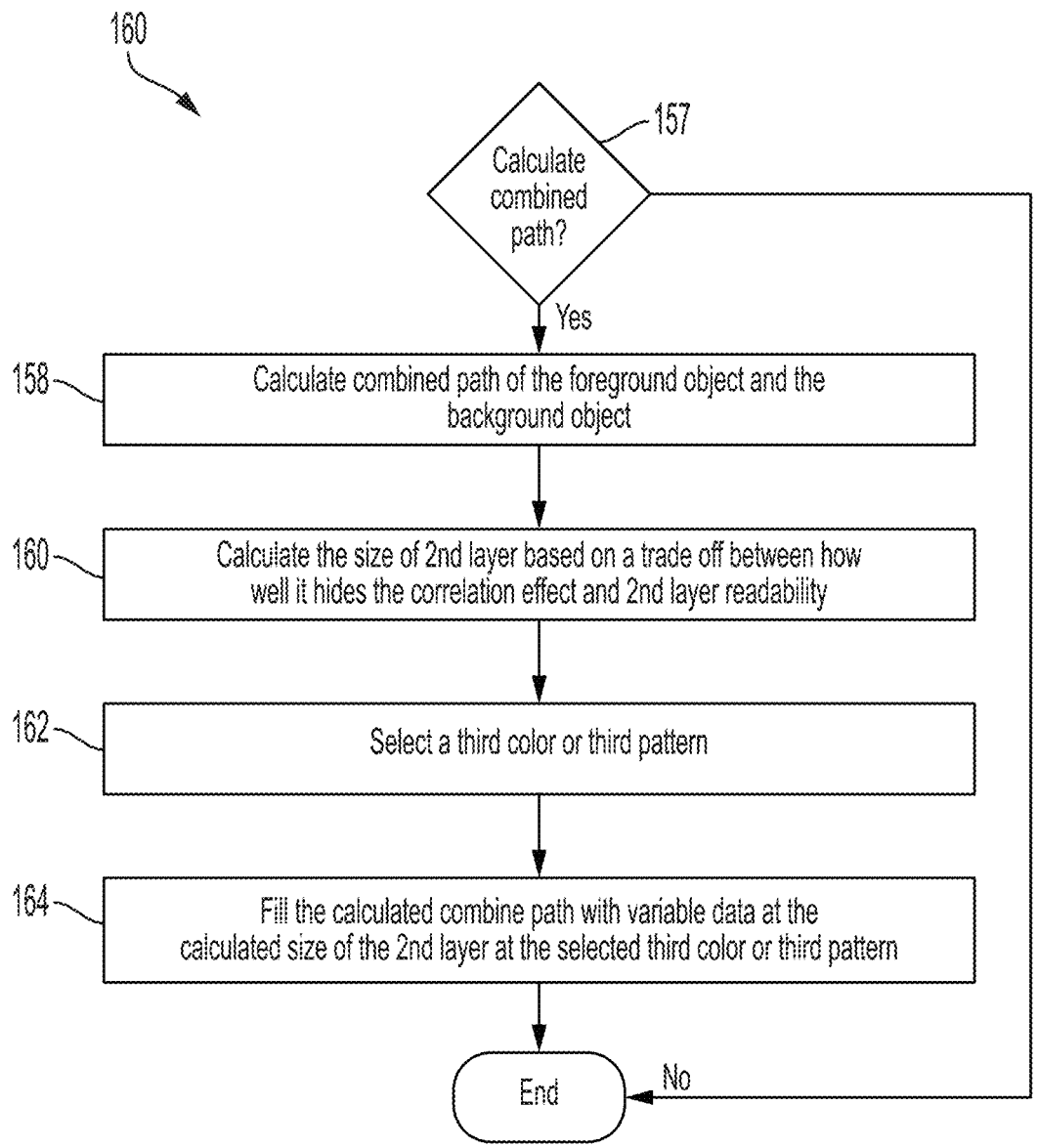
FIG. 6 illustrates a flow chart of operations illustrating logical operational steps of a method for providing two layer correlation marks with a variable data hiding layer, in accordance with an alternative embodiment.

FIG. 6 illustrates a flow chart of operations illustrating logical operational steps of a method 160 for providing two layer correlation marks with a variable data hiding layer, in accordance with an alternative embodiment. The embodiment shown in FIG. 6 is similar to the embodiment depicted in FIG. 5 with the difference that an optional step or operation may be implemented, as shown at decision block 157 to determine whether or not to proceed with the subsequent operations depicted at block 158, block 160, block 162, and block 164. If a decision is made not to proceed with these operations, then the process terminates as shown at block 166. Otherwise, the operations continue as depicted in FIG. 6.

Figure 7:
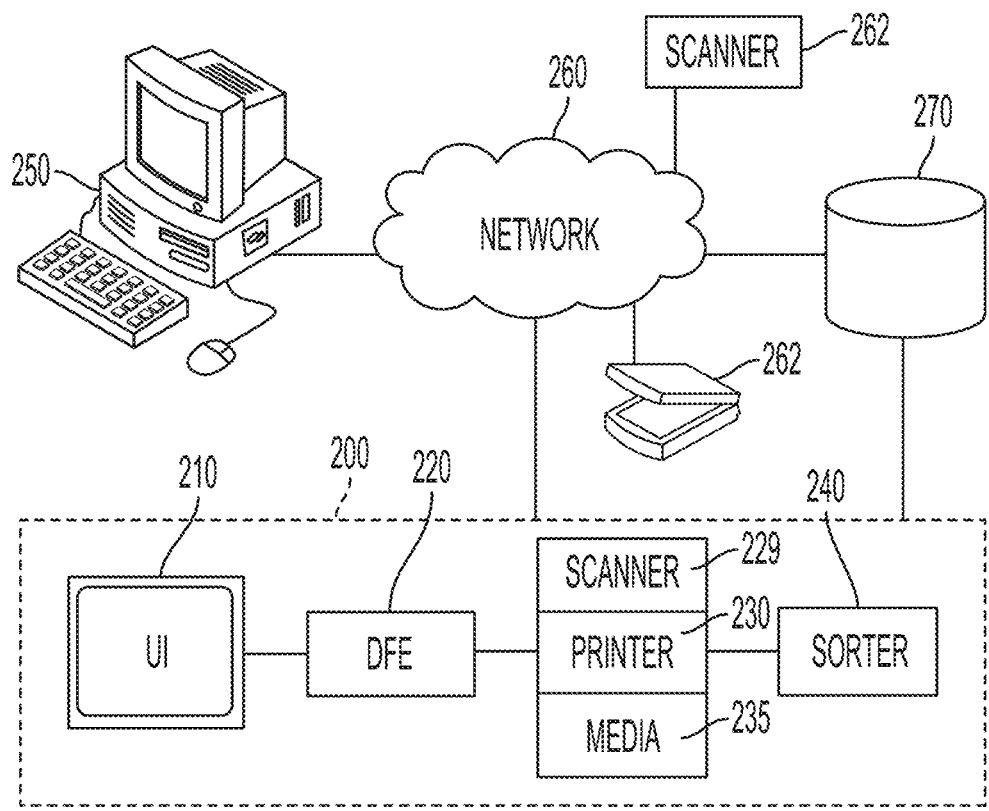
FIG. 7 illustrates a block diagram of a printing system suitable for implementing one or more of the disclosed embodiments.

With reference to FIG. 7, a printing system (or image rendering system) 200 suitable for implementing various aspects of the exemplary embodiments described herein is illustrated. The printing system 200 can implement rendering operations such as scanning a document via a scanner and printing a document via a printer, wherein the document includes the disclosed two-layer correlation mark with a variable data hiding layer.

The printing system 200 can be used to render an image in which a variable data layer is added to correlation marks, allowing a second layer of variable data to be printed where previously there was only one. This concept is an extension of the use of a correlation mark using vector patterns with a 'hiding layer', which better hides the edges of the correlation mark. The 'hiding layer' can be composed of a variable data stream. Benefits of the embodiments include the use of an extra variable data layer in the space where previously only the correlation mark data was encoded.

Note that in the past a segmentation hiding layer was used to improve the hiding of the correlation mark without the decoding key. For example, U.S. Patent Application Publication No. 20190297221A1 entitled "Segmentation Hiding Layer for Vector Pattern Correlation Marks", which published on Sep. 26, 2019 to inventor Edward Chapman and Applicant Xerox Corporation disclosed such an approach. U.S. Patent Application Publication No. 20190297221A1 is incorporated herein by reference in its entirety. By replacing that geometric segmentation hiding layer with variable data as discussed herein, however, we can add a second variable data layer that appears without the decoding key while still improving hiding without the decoding key and disappears with it.

Note that the term 'scanner' as utilized herein can refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 7. For example, the scanner 229 is shown in FIG. 7 as a part of the printing system 200. Alternatively, or in addition to the scanner 229 included as a part of the printing system 100, a scanner may be implemented as a separate scanner 262 also depicted in FIG. 7, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, a digital front-end (DFE) controller 220, and at least one print engine 230. The print engine 230 has access to print media 235 of various sizes and cost for a print job. The printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path, as known in the art.

Figure 8:
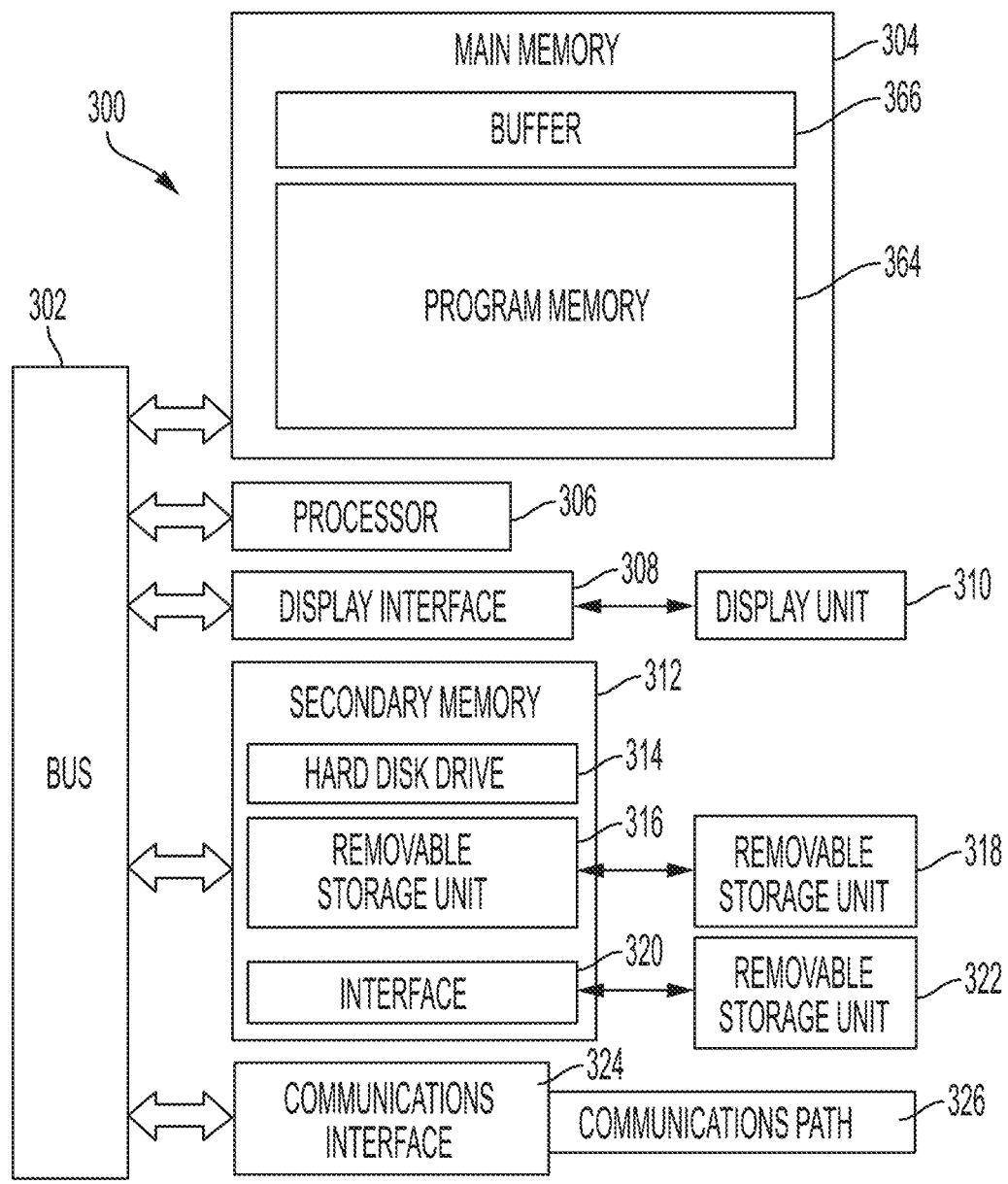
FIG. 8 illustrates a block diagram of a digital front-end controller useful for implementing one or more of the disclosed embodiments.

With respect to FIG. 8, an exemplary DFE (Digital Front End) controller 300 is shown in greater detail. The DFE controller 300 can include one or more processors, such as processor 306 capable of executing machine executable program instructions. The processor 306 can function as a DFE processor.

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded, but may be optionally created inside the DFE in a so-called characterization step.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 7 and/or the DFE controller 300 shown in FIG. 8. A "module" can perform the various steps, operations or instructions discussed herein, such as the steps or operations discussed herein with respect to FIG. 5 and FIG. 6.

The method 150 shown in FIG. 5 and the method 160 depicted in FIG. 6 may be implemented, in part, in a computer program product comprising a module that may be executed by, for example, DFE controller 220 discussed previously with respect to FIG. 7. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 7).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning.

Based on the foregoing, it can be appreciated that a number of embodiments including preferred and alternative embodiments are disclosed herein. In one embodiment, a method for rendering a correlation mark on or through a recording medium, can involve: determining a combined path of a foreground comprising a first layer based on a first correlation pattern and a background comprising a second layer based on a second correlation pattern; calculating a size of the second layer based on a trade off between how well the second layer hides a correlation effect and a readability of the second layer; and filling the combined path with variable data at the size of the second layer at a selected color or a third correlation pattern to produce a two-layer correlation mark having a variable data hiding layer for rendering on or through a recording medium, the two-layer correlation mark including the first layer and the second layer with the combined path filed with the variable data at the size of the second later at the selected color or the third correlation pattern.

In an embodiment, the foreground can comprise a variable object.

In an embodiment, the background can comprise a variable object.

In an embodiment, the foreground can comprise a foreground object.

In an embodiment, the background can comprise a background object.

In an embodiment, background can comprise a background object text box and the foreground comprises a foreground object text box.

In an embodiment, the variable data can comprise a variable data stream.

In another embodiment, a system for rendering a correlation mark on or through a recording medium, can include at least one processor and a non-transitory computer-usable medium embodying computer program code, the computer-usable medium operable to communicate with the at least one processor. The computer program code can include instructions executable by the at least one processor and operable to: determine a combined path of a foreground comprising a first layer based on a first correlation pattern and a background comprising a second layer based on a second correlation pattern; calculate a size of the second layer based on a trade off between how well the second layer hides a correlation effect and a readability of the second layer; and fill the combined path with variable data at the size of the second layer at a selected color or a third correlation pattern to produce a two-layer correlation mark having a variable data hiding layer for rendering on or through a recording medium, the two-layer correlation mark including the first layer and the second layer with the combined path filed with the variable data at the size of the second layer at the selected color or the third correlation pattern.

In yet another embodiment, a correlation mark can comprise a two-layer correlation mark including a first layer and a second layer, wherein: a combined path can be determined from a foreground comprising the first layer based on a first correlation pattern and a background comprising the second layer based on a second correlation pattern; a size of the second layer can be calculated based on a trade off between how well the second layer hides a correlation effect and a readability of the second layer; and the combined path can be filled with variable data at the size of the second layer at a selected color or a third correlation pattern to produce the two-layer correlation mark having a variable data hiding layer for rendering on or through a recording medium, the two-layer correlation mark including the first layer and the second layer with the combined path filed with the variable data at the size of the second later at the selected color or the third correlation pattern.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a correlation mark, comprising:
   determining a combined path of a foreground comprising a first layer based on a first correlation pattern and a background comprising a second layer based on a second correlation pattern;
   calculating a size of the second layer based on a trade off between how well the second layer hides a correlation effect and a readability of the second layer; and
   filling the combined path with variable data at the size of the second layer at a selected color or a third correlation pattern to produce a two-layer correlation mark having a variable data hiding layer for rendering, the two-layer correlation mark including the first layer and the second layer with the combined path filed with the variable data at the size of the second layer at the selected color or the third correlation pattern.

2. The method of claim 1 wherein the foreground comprises a variable object.

3. The method of claim 1 wherein the background comprises a variable object.

4. The method of claim 1 wherein foreground comprises a foreground object.

5. The method of claim 1 wherein the background comprises a background object.

6. The method of claim 1 wherein the background comprises a background object text box and the foreground comprises a foreground object text box.

7. The method of claim 1 wherein the variable data comprises a variable data stream.

8. A system for rendering a correlation mark, comprising:
   at least one processor; and
   a non-transitory computer-usable medium embodying computer program code, the computer-usable medium operable to communicate with the at least one processor, the computer program code comprising instructions executable by the at least one processor and operable to:
   determine a combined path of a foreground comprising a first layer based on a first correlation pattern and a background comprising a second layer based on a second correlation pattern;
   calculate a size of the second layer based on a trade off between how well the second layer hides a correlation effect and a readability of the second layer; and fill the combined path with variable data at the size of the second layer at a selected color or a third correlation pattern to produce a two-layer correlation mark having a variable data hiding layer for rendering, the two-layer correlation mark including the first layer and the second layer with the combined path filed with the variable data at the size of the second layer at the selected color or the third correlation pattern.

9. The system of claim 8 wherein the foreground comprises a variable object.

10. The system of claim 8 wherein the background comprises a variable object.

11. The system of claim 8 wherein foreground comprises a foreground object.

12. The system of claim 8 wherein the background comprises a background object.

13. The system of claim 8 wherein the background comprises a background object text box and the foreground comprises a foreground object text box.

14. The system of claim 8 wherein the variable data comprises a variable data stream.

15. A correlation mark, comprising:
a two-layer correlation mark including a first layer and a second layer, wherein:
a combined path is determined from a foreground comprising the first layer based on a first correlation pattern and a background comprising the second layer based on a second correlation pattern;
calculating a size of the second layer is calculated based on a trade off between how well the second layer hides a correlation effect and a readability of the second layer; and
the combined path is filled with variable data at the size of the second layer at a selected color or a third correlation pattern to produce the two-layer correlation mark having a variable data hiding layer for rendering, the two-layer correlation mark including the first layer and the second layer with the combined path filed with the variable data at the size of the second layer at the selected color or the third correlation pattern.

16. The correlation mark of claim 15 wherein the foreground comprises a variable object.

17. The correlation mark of claim 15 wherein the background comprises a variable object.

18. The correlation mark of claim 15 wherein foreground comprises a foreground object.

19. The correlation mark of claim 15 wherein the background comprises a background object.

20. The correlation mark of claim 15 wherein the background comprises a background object text box and the foreground comprises a foreground object text box.

* * * * *